(12) United States Patent
Baek et al.

(10) Patent No.: US 9,749,098 B2
(45) Date of Patent: Aug. 29, 2017

(54) METHOD AND APPARATUS FOR TRANSMITTING AND RECEIVING SYSTEM INFORMATION IN MOBILE COMMUNICATION SYSTEM

(71) Applicant: Electronics and Telecommunications Research Institute, Daejeon (KR)

(72) Inventors: Seung-Kwon Baek, Daejeon (KR); Eunkyung Kim, Daejeon (KR); Kwang Jae Lim, Daejeon (KR); Jae Sun Cha, Daejeon (KR); Sung Cheol Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/707,821

(22) Filed: May 8, 2015

(65) Prior Publication Data

US 2015/0326371 A1    Nov. 12, 2015

(30) Foreign Application Priority Data

May 9, 2014  (KR) .................. 10-2014-0055882
May 8, 2015  (KR) .................. 10-2015-0064789

(51) Int. Cl.
*H04W 72/00* (2009.01)
*H04L 5/00* (2006.01)
(Continued)

(52) U.S. Cl.
CPC ............. *H04L 5/00* (2013.01); *H04L 5/0058* (2013.01); *H04W 16/32* (2013.01); *H04W 48/12* (2013.01); *H04W 84/042* (2013.01)

(58) Field of Classification Search
CPC .... H04L 5/0058; H04W 16/32; H04W 48/12; H04W 84/042
(Continued)

(56) References Cited

U.S. PATENT DOCUMENTS 8,538,444 B2 *  9/2013  Lee .................. H04W 48/12
                                                455/450
8,594,054 B2 * 11/2013  Chin ................ H04W 24/10
                                                370/335
(Continued)

FOREIGN PATENT DOCUMENTS

WO       2014036734 A1    3/2014

OTHER PUBLICATIONS

3rd Generation Partnership Project; Technical Specification Group Radio Access Network; Scenarios and Requirements for Small Cell Enhancements for E-UTRA and E-UTRAN, 3GPP TR 36.932, Mar. 2013, V 12.1.0, 3GPP Organizational Partners.
(Continued)

*Primary Examiner* — Charles Shedrick
(74) *Attorney, Agent, or Firm* — William Park & Associates Ltd.

(57) ABSTRACT

A method and apparatus of receiving system information of an SeNB, including configuring connection to an MeNB and receiving a RRC Connection Reconfiguration message including the system information of a cell included in a SCG controlled by the SeNB, and a method of sharing frame offset between a MCG controlled by an MeNB and an SCG controlled by an SeNB connected to the MeNB through non-ideal backhaul, including measuring system frame number (SFN) and subframe number (SN) of a cell included in the SCG and sharing the frame offset, which is determined based on the SFN and the SN, with the MeNB or the SeNB are provided.

15 Claims, 11 Drawing Sheets

(51) Int. Cl.
*H04W 16/32* (2009.01)
*H04W 48/12* (2009.01)
*H04W 84/04* (2009.01)

(58) Field of Classification Search
USPC ............... 455/456.1, 450; 370/320, 330
See application file for complete search history.

(56) References Cited

U.S. PATENT DOCUMENTS

| | | | | | |
|---|---|---|---|---|---|
| 2011/0080962 | A1* | 4/2011 | Blankenship | ........ | H04B 7/2606 375/259 |
| 2012/0113843 | A1* | 5/2012 | Watfa | ................ | H04W 72/1289 370/252 |
| 2012/0115474 | A1* | 5/2012 | Lee | .................... | H04W 72/082 455/435.1 |
| 2013/0260786 | A1* | 10/2013 | Song | ....................... | H04W 4/02 455/456.1 |
| 2013/0267246 | A1* | 10/2013 | Wang | .................... | H04W 24/10 455/456.1 |
| 2013/0286906 | A1* | 10/2013 | Seo | ................... | H04W 72/0426 370/280 |
| 2015/0003301 | A1* | 1/2015 | He | ........................ | H04B 7/0452 370/280 |
| 2015/0327280 | A1* | 11/2015 | Zhang | ....................... | H04L 5/14 370/280 |
| 2015/0358945 | A1* | 12/2015 | Susitaival | ............. | H04W 48/16 370/329 |
| 2016/0157095 | A1* | 6/2016 | Zhang | ............... | H04W 52/0209 380/273 |

OTHER PUBLICATIONS

System Information and SFN handling for Dual Connectivity, 3GPP TSG-RAN WG2 #85bis, Mar.-Apr. 2014, R2-141101, NTT DOCOMO, Inc., Samsung, LG Electronics Inc., CATT, Mediatek, Ericsson, InterDigital, Broadcom Corporation, Nokia, NSN.

3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects, 3GPP TR 36.842, Aug. 2013, V0.2.1, 3GPP Organizational Partners.

SFN handling and SI change for SCG in Dual Connectivity, 3GPP TSG-RAN2 Meeting #86, May 2014, R2-142117, ETRI, Seoul, Korea.

* cited by examiner

METHOD AND APPARATUS FOR TRANSMITTING AND RECEIVING SYSTEM INFORMATION IN MOBILE COMMUNICATION SYSTEM

CROSS-REFERENCE TO RELATED APPLICATION

This application claims priority to and the benefit of Korean Patent Application Nos. 10-2014-0055882 and 10-2015-0064789 filed in the Korean Intellectual Property Office on May 9, 2014 and May 8, 2015, the entire contents of which are incorporated herein by reference.

BACKGROUND OF THE INVENTION (a) Field of the Invention

The present invention relates to a method and apparatus for transmitting and receiving system information in a dual connectivity mobile communication system in which both a master base station and a secondary base station are connected to a mobile terminal.

(b) Description of the Related Art

In $3^{rd}$ generation partnership project long term evolution/system architecture evolution (3GPP LTE/SAE), the standardization of a small cell enhancement (SCE) technology is in progress. A small cell improvement technology is a technology for densely disposing small cells in a macro cell-based cellular network in a multi-layered manner and increasing the capacity of a wireless network through close coordination between a macro cell base station and a small cell base station. An object of the small cell improvement technology is to accommodate explosive traffic increase and to secure coverage essential for mobile communication and efficient mobility management by densely disposing high-density small cells in order to increase spectrum efficiency per area. In order to achieve the object, a 3GPP radio access network (RAN) has had discussions on a scenario and requirements for small cell improvement in an evolved-UMTS terrestrial radio access (E-UTRA) and evolved-UMTS terrestrial radio access network (E-UTRAN), and has approved a physical layer and high layer study item (SI) for small cell improvement in an RAN conference in December of 2012.

For such small cell improvement in a cellular network taken into consideration in the 3GPP, three scenarios associated with the deployment, spectrum, and traffic of a small cell and compatibility with previous standards have been defined. Further, technical issues and solutions for the defined scenarios have been discussed. In scenario 1, a macro cell and a small cell use the same frequency in an architecture in which the macro cell and the small cell overlap with each other. In scenario 2, a macro cell and a small cell use different frequencies in an architecture in which the macro cell and the small cell overlap with each other. In scenario 3, only a disposed small cell is used in an architecture in which a macro cell and the small cell do not overlap with each other.

In 3GPP, several element technologies for improving performance of a mobile communication network according to the introduction of high-density small cells have been reviewed through the study item period based on such scenarios. As a result of the review, dual connectivity has been suggested as a representative element technology for Rel-12 small cell improvement. Dual connectivity is a technology in which a piece of UE is provided with service using radio resources provided by two or more different network access points connected through non-ideal backhaul.

SUMMARY OF THE INVENTION

The present invention has been made in an effort to provide a method and apparatus for transmitting and receiving system information of a secondary cell group (SCG) in an environment in which frame synchronization between a cell included in a master eNodeB (MeNB) and a cell included in a secondary eNodeB (SeNB) is not guaranteed.

An exemplary embodiment of the present invention provides a method of receiving, by a terminal, system information of an SeNB. The method includes: configuring connection to an MeNB; and receiving a RRC Connection Reconfiguration message including the system information of a cell included in a SCG controlled by the SeNB from MeNB.

The message may be the message received from the MeNB after the MeNB decides modification for at least one cell included in the SCG.

The message may be the message delivered to the MeNB after the SeNB decides update of the system information.

The RRC Connection Reconfiguration message may include information of point of time at which the system information used.

The method may further include: performing an addition procedure for the cell included in the SCG based on the system information; and transmitting RRC Connection Reconfiguration Complete message to the MeNB.

The performing may include applying the system information based on the point of time at which the system information used.

Another exemplary embodiment of the present invention provides a method of sharing, by a terminal, frame offset between a MCG controlled by an MeNB and a SCG controlled by an SeNB connected to the MeNB through non-ideal backhaul. The method includes: measuring SFN and SN of a cell included in the SCG and sharing the frame offset, which is determined based on the SFN and the SN, with the MeNB or the SeNB.

The method may further include receiving MIB from the SeNB, wherein the measuring comprising measuring the SFN and the SN based on the MIB.

The sharing may include: transmitting the SFN and the SN to the MeNB; and receiving the frame offset from the MeNB.

The sharing may include: calculating the frame offset based on the SFN and the SN; and transmitting the frame offset to the MeNB.

The measuring may include receiving RRC Connection Reconfiguration message, which includes measurement indication information element for the frame offset, from the MeNB.

The RRC Connection Reconfiguration message may include RRM measurement configuration message.

The method may further include: receiving RRC Connection Reconfiguration message for adding the cell included in the SCG from the MeNB; and transmitting RRC Connection Reconfiguration Complete message to the MeNB.

Another exemplary embodiment of the present invention provides a method of sharing, by an MeNB, frame offset between an MCG controlled by the MeNB and an SCG controlled by an SeNB connected to the MeNB through non-ideal backhaul. The method includes: calculating the frame offset; and transmitting the frame offset to the SeNB through addition request message (SeNB Addition Request) for a cell included in the SCG.

The calculating may include: receiving SFN of the SeNB; and calculating the frame offset based on the SFN.

The receiving may include: requesting the SFN of the SeNB to an OAM server; and receiving the SFN of the SeNB from the OAM server.

The receiving may include: requesting the SFN of the SeNB to the SeNB through X2 interface between the MeNB and the SeNB; and receiving the SFN of the SeNB from the SeNB.

The method may further include performing addition procedure for the cell included in the SCG based on the frame offset.

The performing may include: receiving acknowledgement message (SeNB Addition Request Acknowledgement) for the addition request message from the SeNB; transmitting RRC Connection Reconfiguration message to a UE; receiving RRC Connection Reconfiguration Complete message from the UE; and transmitting SeNB Reconfiguration Complete message to the SeNB.

The RRC Connection Reconfiguration message may include information of the frame offset.

DETAILED DESCRIPTION OF THE EMBODIMENTS

Figure 1:
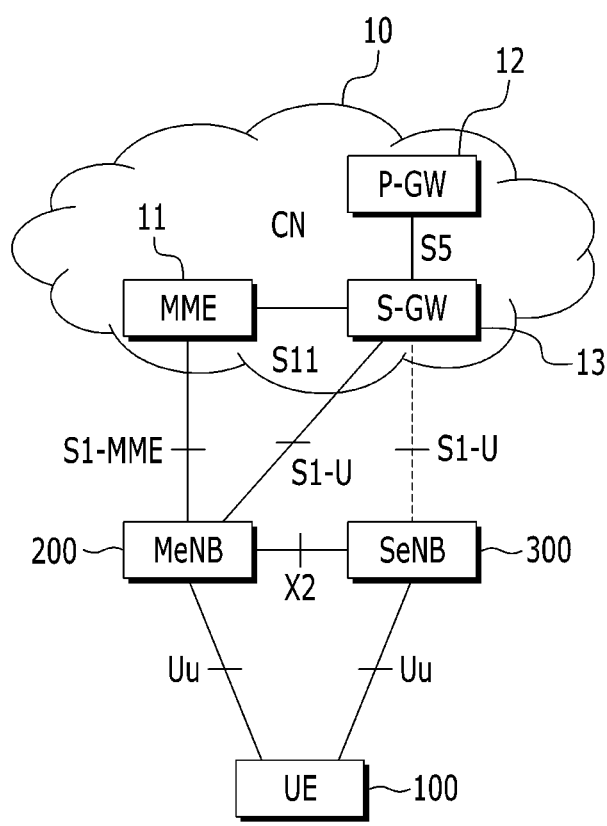
FIG. 1 is a block diagram illustrating a dual connectivity network in accordance with an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal may denote a mobile terminal (MT), a mobile station (MS), an advanced mobile station (AMS), a high reliability mobile station (HR-MS), a subscriber station (SS), a portable subscriber station (PSS), an access terminal (AT), or user equipment (UE), and may include some or all of the functions of the MT, MS, AMS, HR-MS, SS, PSS, AT, and UE.

Furthermore, a base station (BS) may denote an advanced base station (ABS), a high-reliability base station (HR-BS), a nodeB, an evolved node B (eNodeB), an access point (AP), a radio access station (RAS), a base transceiver station (BTS), a mobile multihop relay (MMR)-BS, a relay station (RS) functioning as a base station, a relay node (RN) functioning as a base station, an advanced relay station (ARS) functioning as a base station, a high reliability relay station (HR-RS) functioning as a base station, a small base station [a femoto BS, a home node B (HNB), a home eNodeB (HeNB), a pico BS, a metro BS, or a micro BS], and may include some or all of the functions of the ABS, nodeB, eNodeB, AP, RAS, BTS, MMR-BS, RS, RN, ARS, HR-RS, and small base station.

FIG. 1 is a block diagram illustrating a dual connectivity network in accordance with an exemplary embodiment of the present invention.

In FIG. 1, an MeNB 200 is a master base station that chiefly performs control and service on UE 100 in an overlap cellular network environment, and an SeNB 300 is a secondary base station that provides auxiliary services. X2 is an interface used for close coordination between the MeNB 200 and the SeNB 300, and interoperability with a core network (CN) 10 may be performed through an S1-MME interface and an S1-U interface. For control plane interoperability between an E-UTRAN and the CN 10, the MeNB 200 may perform a protocol procedure along with a mobility management entity (MME) 11 through an S1-MME. The MeNB 200 may take into consideration two types of interoperability architectures depending on the architecture of a user plane protocol for the user plane interoperability between the E-UTRAN and the CN 10. In the case of a user plane protocol architecture 1, the MeNB 200 may send/receive data through dual connectivity while operating in conjunction with a serving gateway (S-GW) 13. In the case of a user plane protocol architecture 2, the MeNB 200 and the SeNB 300 may send/receive data through dual connectivity while operating in conjunction with the S-GW 13. In this case, a mobile terminal may send/receive data through a Uu interface while maintaining the Uu interface with the MeNB 200 and the SeNB 300.

Figure 2A:
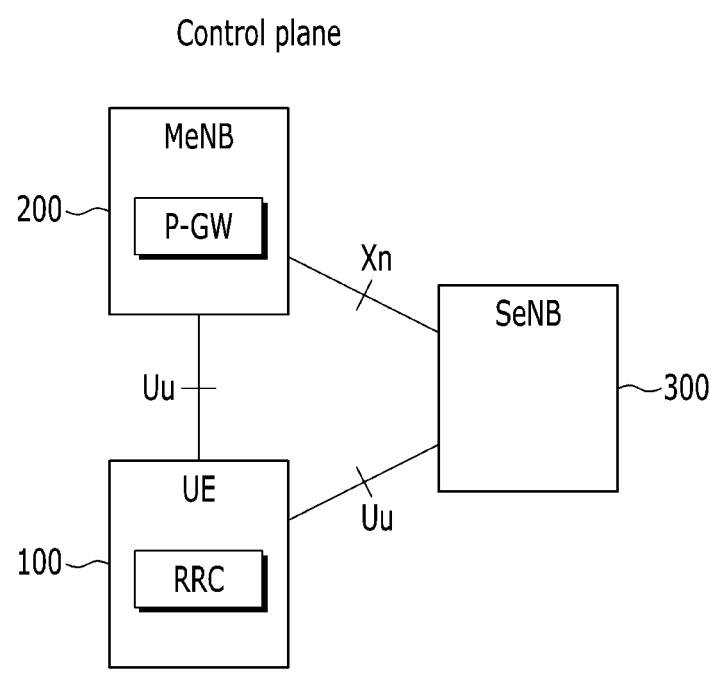
FIGS. 2A and 2B are block diagrams illustrating the protocol architectures of a control plane and a user plane in accordance with an exemplary embodiment of the present invention.
Figure 2B:
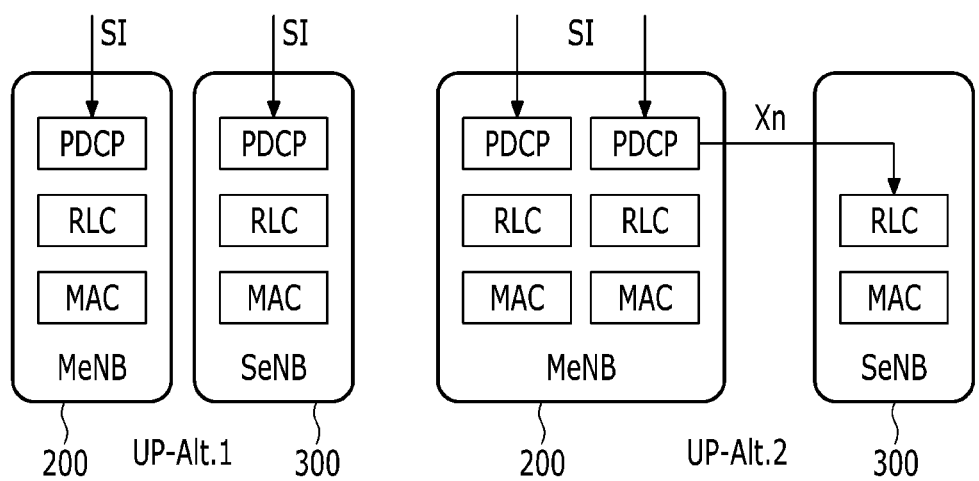

FIGS. 2A and 2B are block diagrams illustrating the protocol architectures of a control plane and a user plane in accordance with an exemplary embodiment of the present invention.

FIGS. 2A and 2B illustrate a control plane protocol architecture and a user plane protocol architecture for supporting dual connectivity based on the network configuration of FIG. 1.

First, the control plane protocol architecture is described below with reference to FIG. 2A. In the control plane protocol architecture, a radio resource control (RRC) protocol layer responsible for radio resource control is placed in the MeNB 200. The RRC layer is not placed in the SeNB 300. That is, the RRC layer of the MeNB 200 is responsible for the radio resource control function of cells managed in the MeNB 200 and the SeNB 300, and may perform an RRC procedure between the SeNB 300 and the UE 100 in lieu of the SeNB 300 and the UE 100.

The user plane protocol architecture is described below with reference to FIG. 2B. The user plane protocol architecture may be divided into a user plane protocol architecture 1 "UP-Alt.1" and a user plane protocol architecture 2 "UP-Alt.2" depending on whether a bearer has been split and the deployment of the user plane protocol of the SeNB 300.

In the user plane protocol architecture 1, a bearer split function is not supported. The MeNB 200 includes a packet data convergence protocol (PDCP) layer, a radio link control (RLC) layer, a media access control (MAC) layer, and a physical (PHY) layer. The SeNB 300 includes a PDCP layer, an RLC layer, a MAC layer, and a PHY layer. That is, in the user plane protocol architecture of the UP-Alt.1, the SeNB 300 includes all the user plane protocol layers of an eNB proposed in 3GPP LTE-A.

The user plane protocol architecture 2 supports the bearer split function. The MeNB 200 includes the PDCP layer, the RLC layer, the MAC layer, and the PHY layer. The SeNB 300 includes the RLC layer, the MAC layer, and the PHY layer. That is, in the user plane protocol architecture of the UP-Alt.2, the SeNB 300 includes the RLC layer, the MAC layer, and the PHY layer from among the user plane protocol layers of the eNB proposed in 3GPP LTE-A. In this case, a user plane protocol used for dual connectivity additionally includes a function for supporting dual connectivity in an 3GPP LTE-A function.

Figure 3:
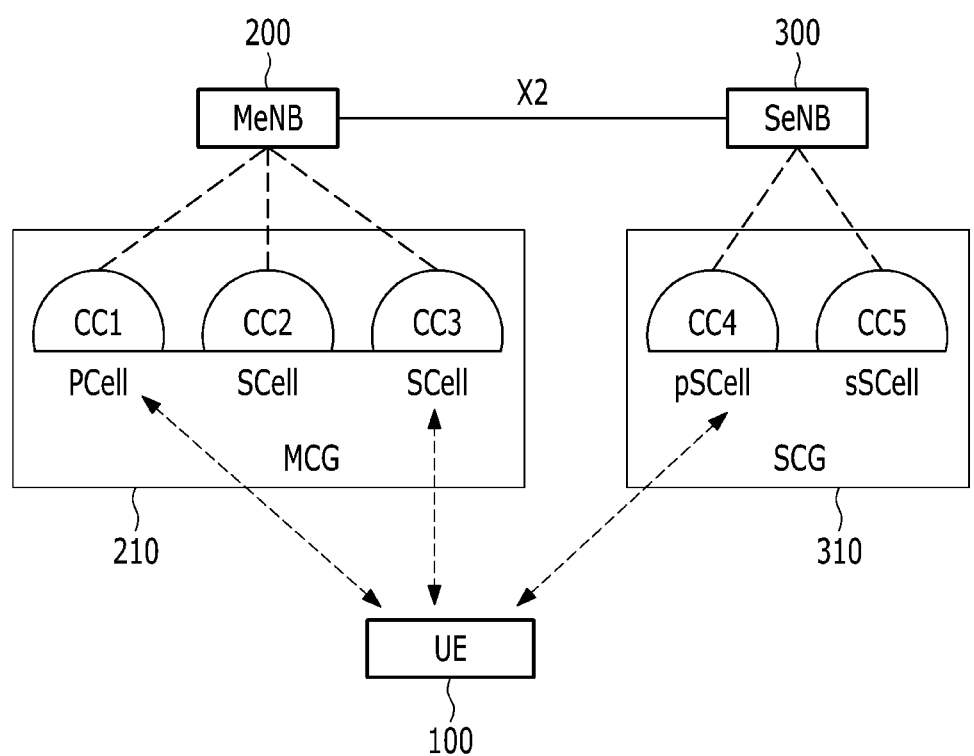
FIG. 3 is a schematic view illustrating the access scenarios of UE in accordance with an exemplary embodiment of the present invention.

FIG. 3 is a schematic view illustrating the access scenarios of UE in accordance with an exemplary embodiment of the present invention.

In FIG. 3, the UE 100 may support dual connectivity and a carrier aggregation (CA). The MeNB 200 may control three cells operating in component carriers CC1, CC2, and CC3, and the SeNB 300 may control two cells operating in component carriers CC4 and CC5. In this case, the three cells operating in the CC1, CC2, and CC3 are included in an MCG 210. The two cells operating in the CC4 and CC5 are included in an SCG 310. Furthermore, the UE may be provided with dual connectivity-based service through the three cells that operate in the three cells CC1, CC2, and CC3 controlled by the MeNB 200.

The UE 100 in accordance with an exemplary embodiment of the present invention may perform a search procedure on a specific cell and receive system information used in a retrieved cell. The UE 100 may obtain symbol synchronization and frame synchronization of a retrieved cell through a cell search procedure and obtain a physical cell identifier (PCI) used in the retrieved cell. Thereafter, the UE 100 may receive system information, including information about a bandwidth and uplink/downlink configuration used in the cell, and additionally perform a cell access procedure.

In a mobile communication system in accordance with an exemplary embodiment of the present invention, two types of system information may be used depending on a channel and the type of information. Each of the types of system information may be delivered to a terminal through an RRC message.

First, a master information block (MIB) includes restricted information essential for system access, and may be delivered through a broadcasting channel (BCH). The MIB may include downlink cell bandwidth information, physical hybrid automatic repeat request indicator channel (PHICH) configuration information, and system frame number (SFN) information.

A system information block (SIB) includes cell-specific information for system access, and may be delivered through a downlink-shared channel (DL-SCH). A variety of types of SIBs SIB1-SIB6 may be present depending on information included therein.

In a mobile communication network that supports dual connectivity in accordance with an exemplary embodiment of the present invention, the MeNB 200 and the SeNB 300 are connected through non-ideal backhaul. Each eNB may perform a CA function. Accordingly, the MeNB 200 and the SeNB 300 can provide service to the UE 100 using a plurality of CCs through the CA function in addition to the dual connectivity function. Independent system information may be used in each CC.

Referring to FIG. 3, in a mobile communication network supporting dual connectivity in accordance with an exemplary embodiment of the present invention, a group of cells controlled by the MeNB 200 may be the MCG 210, and a group of cells controlled by the SeNB 300 may be the SCG 310. Furthermore, a cell that belongs to the MCG 210 and that is used to send a physical uplink control channel (PUCCH) of the cell group (CG) is a primary cell (PCell). A cell that belongs to the SCG 310 and that is used for the transmission of a PUCCH of the CG is a special primary cell (pSCell).

In a mobile communication network supporting dual connectivity in accordance with an exemplary embodiment of the present invention, an environment in which the MeNB 200 and the SeNB 300 have been synchronized and an environment in which the MeNB 200 and the SeNB 300 have not been synchronized may be taken into consideration. The RRC layer of a control plane protocol in accordance with an exemplary embodiment of the present invention is placed in the MeNB 200. Accordingly, a procedure for delivering and changing system information of the MeNB 200 may be performed in accordance with the RRC protocol procedure. Since the SeNB 300 does not include the RRC layer, a method of delivering system information of a cell controlled by the SeNB 300 is performed as follows. In an Rel-12 small cell enhancement (SCE) in which the MeNB 200 and the SeNB 300 have been connected through non-ideal backhaul, a point of time at which changed system information is applied in a cell included in the SCG 310 controlled by the SeNB 300 may influence system performance. A change of system information of a pSCell may have a great influence on performance of the SCG 310 because it may influence the uplink configuration of all cells included in the SCG 310.

In a cell included in the MCG 210 (hereinafter, "MCG cell") controlled by the MeNB 200, a PCell and an Scell have been connected through ideal backhaul. System information of the MCG cell may be delivered through the following RRC procedure.

First, the UE 100 may receive system information at a point of time at which it accesses a PCell. In this case, the UE 100 may obtain the system information by receiving an MIB and an SIB after a cell search procedure. Furthermore, the UE 100 may also receive the system information when an Scell is added. When an Scell is added, system information of the SCell to be added may be delivered to the UE 100 through an RRC connection reconfiguration message.

Thereafter, the UE 100 may add the Scell using the system information included in the received RRC connection reconfiguration message.

If system information of a PCell included in the MCG 210 is changed, the UE 100 may check whether system information has been changed in the PCell of the MCG 210 by periodically checking a paging message. If system information of an Scell included in the MCG 210 is changed, the MeNB 200 may deliver the changed system information to the UE 100 through an RRC connection reconfiguration procedure when the system information is changed. In this case, an information element (IE) included in the RRC connection reconfiguration message may include information about the release and addition of the Scell whose system information is changed.

If system information of a cell included in the SCG 310 (hereinafter "SCG cell") controlled by the SeNB 300 is changed, the changed system information may be delivered to the UE 100 according to the following method.

Alt.1: a method using a wireless access interface between an MeNB and UE (Uu between MeNB/UE)

In this case, as in a CA, system information of the SCG cell may be delivered to the UE 100 through the MeNB 200. The system information is delivered through the X2 interface between the SeNB 300 and the MeNB 200. The MeNB 200 that has received the system information from the SeNB 300 may deliver the system information of the SCG cell to the UE 100 through an RRC connection reconfiguration procedure.

Alt.2: a method using a wireless access interface between an SeNB and UE (Uu between SeNB/UE)

In this case, the UE 100 may directly access the SeNB 300 and receive broadcasted system information.

In accordance with an exemplary embodiment of the present invention, system information of the SCG cell may be delivered to the UE 100 through a wireless access interface between the MeNB 200 and the UE 100 by taking into consideration compatibility with standards and a complexity problem in the UE 100.

In this case, if system information of the SCG cell is delivered using the Alt.1 in the state in which a cell included in the MCG 210 has not been synchronized with a cell included in the SCG 310, a point of time at which the system information used in the cell of the SCG 310 is used needs to be synchronized with a point of time at which system information used in the UE 100 is used. For example, if the time taken to send/receive a message on the X2 is 60 ms, the system information of the SCG cell may be applied in the UE 100 after a minimum of 60 ms after the system information is delivered. Accordingly, configuration information used for transmission in the UE 100 may not be matched with the system information used in the cell of the SCG 310 during the time corresponding to X2 delay. Such a mismatch may influence system performance. Accordingly, when system information of the SCG cell is delivered, X2 delay needs to be taken into consideration. The UE 100 in accordance with an exemplary embodiment of the present invention may obtain or share the frame offset of the MCG cell and the SCG cell and efficiently receive system information using the frame offset of the MCG cell and the SCG cell.

A mobile communication system in accordance with an exemplary embodiment of the present invention may define frames as a system frame and a subframe and use the defined frames in the operation procedure of a system. A representative procedure that uses a system frame number and a subframe number may include a discontinuous reception (DRX) configuration and a measurement gap configuration. For each procedure, frame information (i.e., a system frame number or subframe number) specified in the UE 100 may be used.

The UE 100 providing dual connectivity uses an independent user plane protocol in order to access the MeNB 200 or the SeNB 300. Accordingly, if the MeNB 200 and the SeNB 300 recognize mutual frame information and operate, there may be a gain in terms of network performance. For example, in a DRX configuration for reducing the battery consumption of the UE 100, if the MeNB 200 and the SeNB 300 perform control at the same point of time through coordination, high performance may be expected compared to a case where the CG of each eNB independently performs control.

As described above, the MCG 210 and the SCG 310 are not synchronized while having independent system frame numbers and subframe numbers. Accordingly, each of the MCG 210 and the SCG 310 providing dual connectivity needs to check offset information about its own system frame number and subframe number for mutual coordination. Furthermore, in order to check a point of time at which system information of the SCG cell is applied or instruct the point of time or to deliver and apply system information in which delay of an X2 interface has been taken into consideration, a frame offset needs to be shared between the MCG 210 and the SCG 310.

In a mobile communication network providing dual connectivity in accordance with an exemplary embodiment of the present invention, a frame offset (or system frame offset and subframe offset) may be obtained based on the measurement of the UE 100 or may be obtained based on a procedure performed between network function nodes.

First, a method of obtaining a frame offset based on the measurement of the UE 100 is described below. In the method of obtaining a frame offset based on the measurement of the UE 100, the UE 100 having a dual connectivity function may receive the MIB of the SeNB 300 and obtain the system frame numbers (SFN) and subframe numbers (SN) of the SCG cell and MCG cell from the received MIB. In this case, the MIB may be sent in the physical broadcast channels (PBCH) of the first subframes of all the system frames. Accordingly, the UE 100 may receive the MIB of the SeNB 300, may obtain the SFN of the SCG cell, and may determine a point of time at which the MIB was received to be the subframe number 0 (SN0) of the SCG cell. Furthermore, the UE 100 can be aware of both the SFNs and SNs of the MCG cell and SCG cell because it may be aware of the SFN and SN of the MCG cell at a point time at which the MIB of the SCG cell was received. Accordingly, in accordance with an exemplary embodiment of the present invention, the UE 100 may be aware of the SFN of the MCG cell through the point of time at which the MIB was received (i.e., the SN0 of the SCG cell). The UE 100 may derive the locations of the system frames of the MCG 210 and SCG 310 based on the SFN of the MCG 210.

Since the MCG 210 and the SCG 310 operate out of synchronization, some of the SNs of the MCG cell may correspond to the SN0, that is, a point of time at which the UE 100 received the MIB of the SCG cell. Accordingly, a maximum number of the SNs of the MCG cell corresponding to the SN0 of the SCG cell may be 2.

Figure 4:
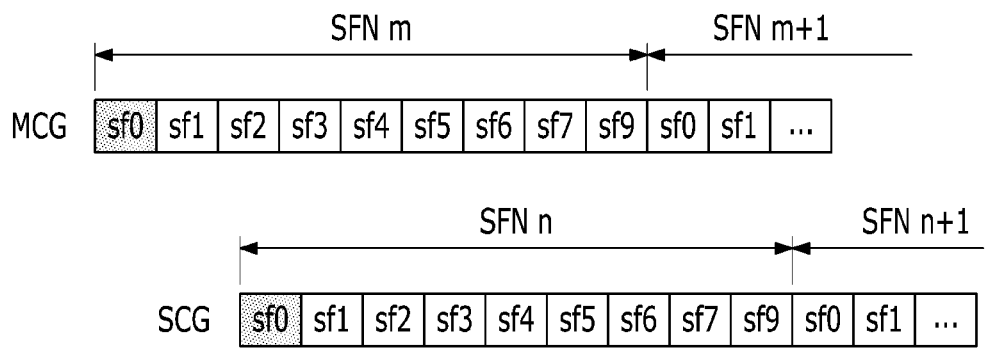
FIG. 4 is a schematic view illustrating a method of estimating an SFN/SN offset in accordance with an exemplary embodiment of the present invention.

FIG. 4 is a schematic view illustrating a method of estimating an SFN/SN offset in accordance with an exemplary embodiment of the present invention.

Referring to FIG. 4, the UE 100 may receive an MIB in the SFN n of an SCG cell, and may be aware of the SFN and SN of an MCG cell corresponding to the SN0 (i.e., a subframe (sf) 0) of the SCG cell. In FIG. 4, the SNs of the MCG corresponding to the SN0 of the SCG cell are sf2 and sf3. Thereafter, information about the SFNs and SNs of the MCG cell and SCG cell obtained by the UE 100 is delivered to the MeNB 200 and may be used to derive an offset. In accordance with an exemplary embodiment of the present invention, an SFN offset between an MCG cell and an SCG cell may be derived based on a difference between the SFN of the MCG cell and the SFN of the SCG cell. The SFN of an SCG cell may be derived through Equation 1 below.

$$\text{SFN of SCG against MCG}(x) = x + \text{offset}$$

$$\text{SFN of MCG against SCG}(x) = x - \text{offset} \quad \text{(Equation 1)}$$

where Offset=SFN of MCG−SFN of SCG

Furthermore, a difference between SNs included in the SFN of the MCG cell and the SFN of the SCG cell may be aware from the SN of the MCG cell that corresponds to a point of time (i.e., sf0 of the SCG cell) at which the MIB of the SCG cell was received.

A method of measuring a frame offset based on a procedure between network function nodes is described below. A method of measuring a frame offset based on a procedure between network function nodes may be divided into a method according to an operation and management (OAM) server and a method through an X2 interface between eNBs.

In the method of obtaining a frame offset through the OAM server 400, the OAM server 400 requests an SFN/SN, requested at a specific point of time "time t", from another node in response to an SFN request received from a specific node, receives the SFN/SN from another node, and delivers the received SFN/SN to the MeNB 200. To this end, the OAM server 400 may use a global positioning system (GPS), IEEE1588, or a network time protocol (NTP). In this case, in order to obtain the SFN/SN of the SeNB 300 providing dual connectivity, the MeNB 200 may request SFN/SN information, corresponding to a specific point of time (based on an absolute time), from the OAM server 400. When receiving the request from the MeNB 200, the OAM server 400 may perform a query procedure on the SeNB 300 and deliver the received SFN/SN of the SeNB 300 to the MeNB 200. Thereafter, the MeNB 200 may obtain the frame offset of the SeNB 300.

In the method of obtaining a frame offset through an X2 interface between eNBs, the MeNB 200 may request an SFN/SN from the SeNB 300 at a specific point of time "time t" and obtain the frame offset of the SFN/SN based on the SFN/SN. In this case, the MeNB 200 may use a GPS, IEEE1588, NTP, etc. In order to obtain the SFN/SN of the SeNB 300 providing dual connectivity, the MeNB 200 may request SFN/SN information, corresponding to a specific point of time (based on an absolute time), from the SeNB 300. When receiving the request, the SeNB 300 may perform a measurement procedure and deliver the SFN/SN information, obtained as a result of the measurement, to the MeNB 200. The MeNB 200 may calculate the frame offset of the SeNB 300 based on the SFN/SN information.

A signaling method for sharing a frame offset between an MCG cell and an SCG cell is described below with reference to FIGS. 5 to 7. The signaling method for sharing a frame offset between an MCG cell and an SCG cell may be performed based on the measurement of the UE 100 or may be performed based on a procedure between network function nodes.

First, the signaling method of obtaining and sharing a frame offset based on the measurement of the UE 100 may be divided into a method using an SeNB addition procedure (or SeNB modification procedure) and a method using a measurement report procedure. The method of obtaining a frame offset based on the measurement of the UE 100 may not be performed every time because it has an object of obtaining a frame offset between an MCG cell and SCG cell in which dual connectivity will be configured, but may be selectively performed, if necessary, in response to an instruction from the MeNB 200.

Figure 5:
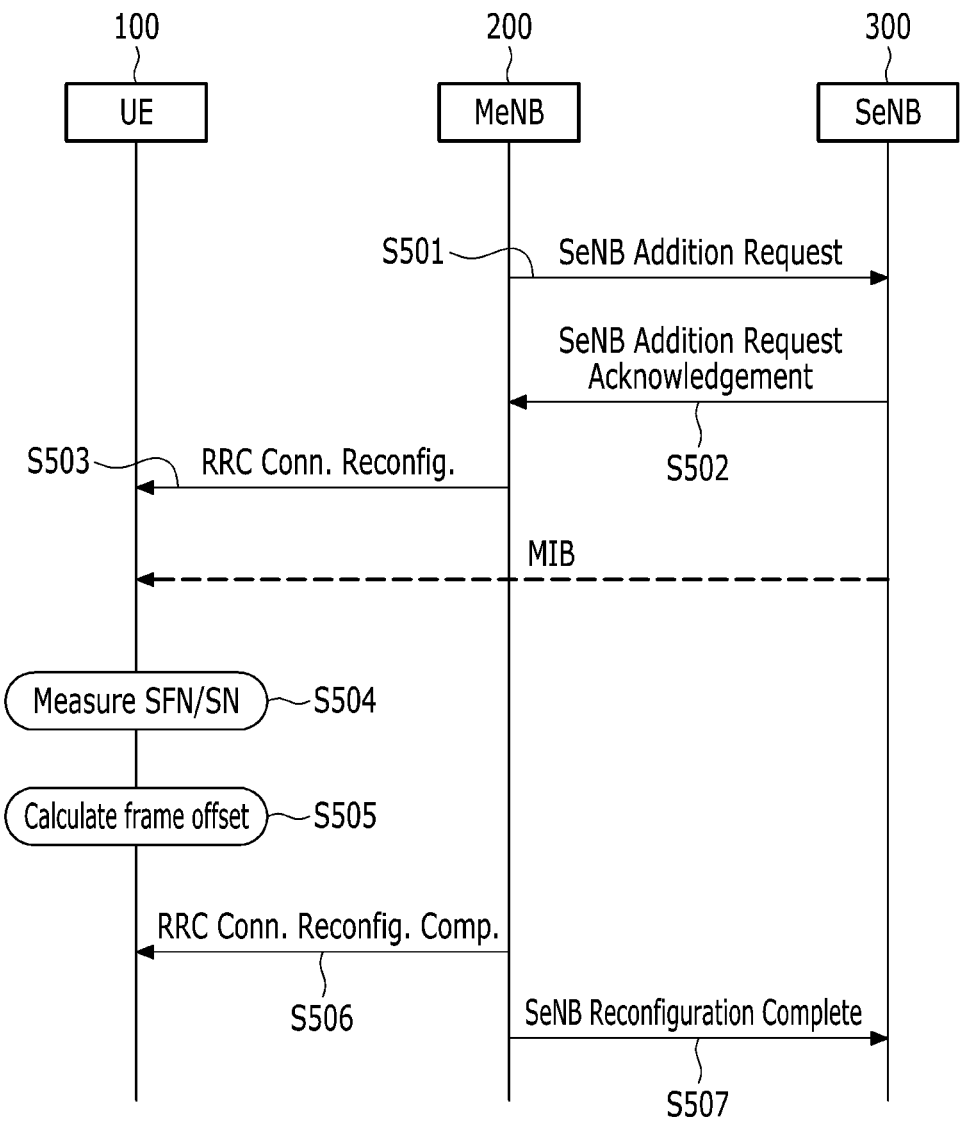
FIG. 5 is a flowchart illustrating a method of sharing a frame offset using an SeNB addition procedure in accordance with an exemplary embodiment of the present invention.

FIG. 5 is a flowchart illustrating a method of sharing a frame offset using an SeNB addition procedure in accordance with an exemplary embodiment of the present invention.

The MeNB 200 may obtain a frame offset between the MCG cell and the SCG cell based on the measurement of the UE 100 when adding an SCG cell by taking into consideration a radio resource management (RRM) measurement result of the UE 100 and a load of the SCG cell, and share the frame offset with the UE 100.

First, the MeNB 200 requests the SeNB 300 to add a cell to the SCG at step S501. In this case, the MeNB 200 delivers an SCG addition request message (SeNB Addition Request) for dual connectivity by taking into consideration an RRM measurement result of the UE 100 and the load state of the SCG cell.

Thereafter, the SeNB 300 delivers a response for adding the cell to the SCG to the MeNB 200 at step S502. That is, the SeNB 300 may perform an admission procedure for the SCG addition request and then deliver an acknowledgement message (SeNB Addition Request Acknowledgement) to the SCG addition request for adding the cell to the SCG to the MeNB 200.

Thereafter, the MeNB 200 instructs the UE 100 to measure the frame offset of the cell that is to be added to the SCG at step S503. The MeNB 200 may instruct the UE 100 to measure the frame offset through an RRC connection reconfiguration message. In this case, the RRC Connection Reconfiguration message may include a measurement indication information element for the SCG cell frame offset.

The UE 100 may perform measurement on the cell that is to be added to the SCG, may receive information about the MIB of the cell that is to be added to the SCG, and may measure SFN/SN information based on the received MIB information at step S504. In this case, the UE 100 may measure SFN/SN information from the MIB information using the method described with reference to FIG. 4 and Equation 1.

The UE 100 may calculate a frame offset between the MCG cell and the SCG cell using the measured SFN/SN information of the MCG cell and SCG cell at step S505. Furthermore, the UE 100 may report the calculated frame offset to the MeNB 200 through an RRC Connection Reconfiguration Complete message at step S506. In this case, the RRC Connection Reconfiguration Complete message may include the information element of the frame offset of the SCG cell.

In this case, or in accordance with another exemplary embodiment of the present invention, the UE 100 may report the measured SFN/SN information of the MCG cell and SCG cell to the MeNB 200. The MeNB 200 may calculate the frame offset between the MCG cell and the SCG cell using the reported SFN/SN information of the MCG cell and SCG cell.

The MeNB 200 may deliver the frame offset information to the SeNB 300 through an SeNB Reconfiguration Complete message at step S507. In this case, the SeNB Reconfiguration Complete message may include the frame offset information element.

Figure 6:
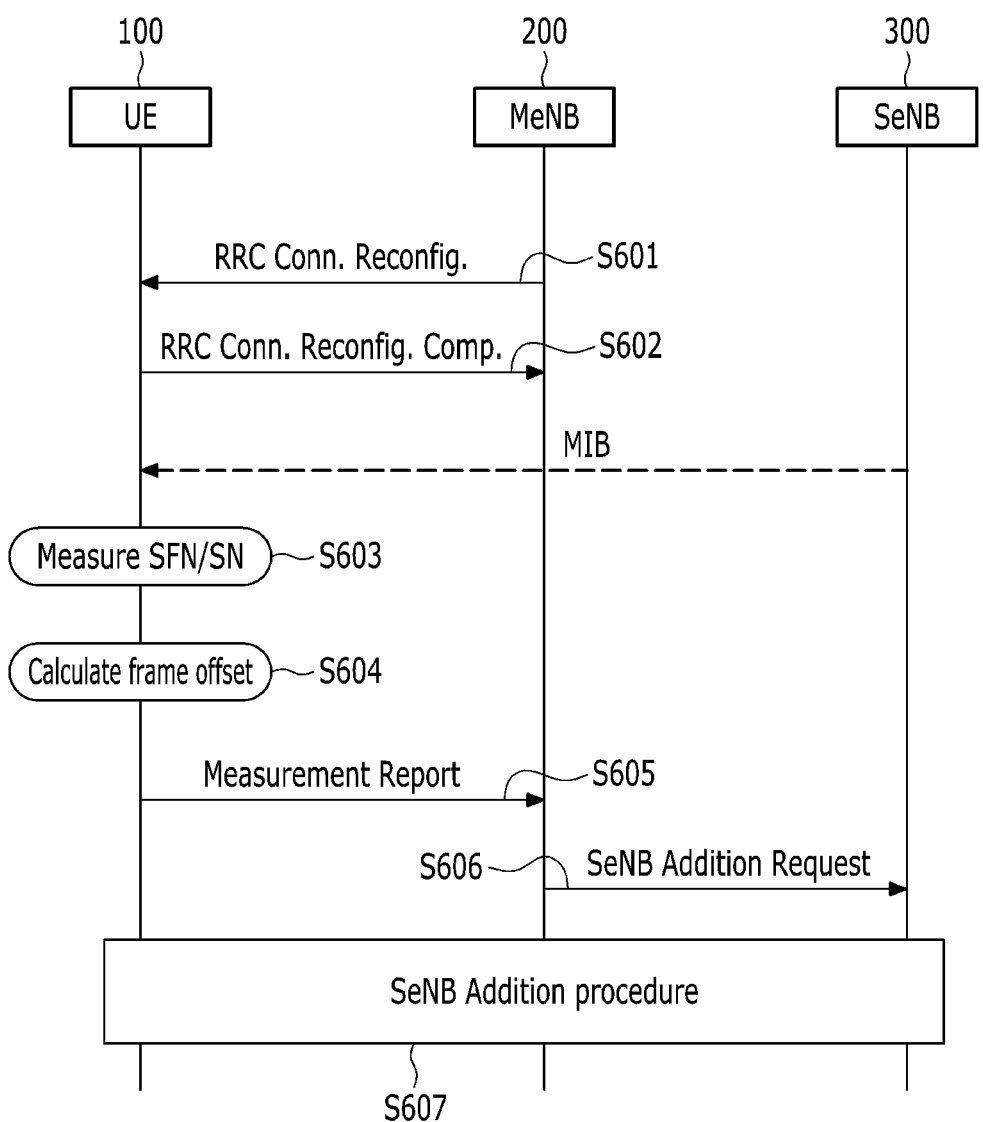
FIG. 6 is a flowchart illustrating a method of sharing a frame offset using a measurement report procedure in accordance with an exemplary embodiment of the present invention.

FIG. 6 is a flowchart illustrating a method of sharing a frame offset using a measurement report procedure in accordance with an exemplary embodiment of the present invention.

The MeNB 200 may obtain a frame offset between the MCG cell and the SCG cell through the RRM measurement report of the UE 100 and share the frame offset with the UE 100. Referring to FIG. 6, the MeNB 200 may obtain the SFN of the SCG cell using a measurement report through a measurement configuration that instructs the UE 100 supporting a dual connectivity function to obtain the SFN of a cell, and may share the obtained SFN information with the UE 100.

First, the MeNB 200 sends an RRM measurement configuration message for measuring the SFN/SN of the SCG cell to the UE 100 at step S601. In this case, the RRM measurement configuration message may be included in an RRC connection reconfiguration message. The RRC connection reconfiguration message may include a measurement instruction information element for the frame offset of the SCG cell. Furthermore, in order to additionally receive an evolved cell global identifier (ECGI) for a PCI that has been previously measured and reported, the MeNB 200 may instruct the acquisition of the ECGI, that is, the PCI of a cell, through an RRM measurement configuration message.

Thereafter, the UE 100 delivers a response to the RRM measurement configuration message to the MeNB 200 through an RRC connection reconfiguration complete message at step S602. Furthermore, the UE 100 performs measurement on a cell to be added to the SCG, receives information about the MIB of the SCG cell, and measures SFN/SN information through the received MIB information at step S603. In addition, the UE 100 calculates a frame offset between the MCG cell and the SCG cell using the measured SFN/SN information at step S604. Thereafter, the UE 100 delivers a measurement report message, including information about the calculated frame offset, to the MeNB 200 at step S605. In this case, the measurement report message may include an information element for the frame offset of the SCG cell.

If the MeNB 200 is responsible for the calculation of the frame offset, the UE 100 may report the measured SFN/SN information to the MeNB 200. The MeNB 200 may calculate the frame offset using the reported SFN/SN information.

If the UE 100 has been instructed to obtain the ECGI of a PCI, the UE 100 may receive the system information, may obtain the ECGI, and may then report the obtained ECGI to the MeNB 200.

Thereafter, the calculated frame offset information may be delivered from the MeNB 200 to the SeNB 300 through an SeNB addition request message (SeNB Addition Request) at step S606. In the case, the SeNB Addition Request may include a frame offset information element. Thereafter, an SCG addition procedure is started based on the shared frame offset at step S607, and the SCG addition procedure may include the step of transmitting the SeNB Addition Request Acknowledgement to the MeNB 200 by the SeNB 300, the step of transmitting the RRC Connection Reconfiguration to the UE 100 by the MeNB 200, the step of transmitting the RRC Connection Reconfiguration Complete to the MeNB 200 after applying the system information about the cell of the SCG by the UE 100, and the step of transmitting SeNB Reconfiguration Complete to the SeNB 300 by the MeNB 200.

The method of obtaining a frame offset based on a procedure between network function nodes and sharing the frame offset is described below.

Figure 7:
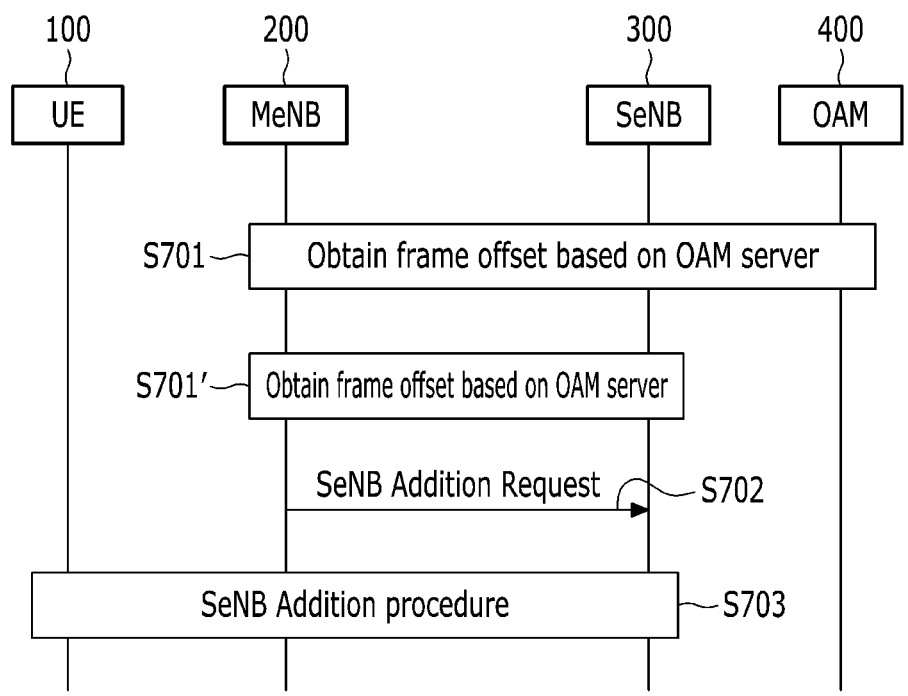
FIG. 7 is a flowchart illustrating a method of sharing a frame offset based on a procedure between network function nodes in accordance with an exemplary embodiment of the present invention.

FIG. 7 is a flowchart illustrating a method of sharing a frame offset based on a procedure between network function nodes in accordance with an exemplary embodiment of the present invention.

In obtaining the frame offset of FIG. 7, the OAM server 400 may be used, or the X2 interface between the MeNB 200 and the SeNB 300 may be used.

First, a method of obtaining a frame offset between the MCG cell and the SCG cell at a specific point of time using the OAM server 400 is described at step S701. The MeNB 200 requests the SFN of a specific SeNB 300, corresponding to a specific point of time, from the OAM server 400. After receiving the request of the MeNB 200, the OAM server 400 requests an SFN value for the specific point of time (i.e., an absolute value) from the specific SeNB 300. In this case, the specific SeNB 300 may measure the SFN value at the specific point of time using a GPS, IEEE1588, or an NTP. Thereafter, the OAM server 400 may deliver the received SFN to the MeNB 200. The MeNB 200 may calculate the frame offset of the SFN based on the SFN received from the OAM server 400.

A method of obtaining a frame offset between the MCG cell and the SCG cell at a specific point of time using the X2 interface is described below at step S701'. First, the MeNB 200 requests an SFN at a specific point of time from the SeNB 300. In response to the request, the SeNB 300 may measure the SFN at the specific point of time (i.e., an absolute time) using a GPS, IEEE 1588, or an NTP, and deliver the measured SFN to the MeNB 200. The MeNB 200 may calculate the frame offset of the SFN based on the received SFN.

Thereafter, the MeNB 200 may transmit the calculated frame offset to the SeNB 300 through an SeNB Addition Request message at step S702. In this case, the SeNB Addition Request message may include a frame offset information element. Thereafter, an SCG addition procedure may be started based on the shared frame offset at step S703, and the SCG addition procedure may include the step of transmitting the SeNB Addition Request Acknowledgement to the MeNB 200 by the SeNB 300, the step of transmitting the RRC Connection Reconfiguration to the UE 100 by the MeNB 200, the step of transmitting the RRC Connection Reconfiguration Complete to the MeNB 200 after applying the system information about the cell of the SCG by the UE 100, and the step of transmitting SeNB Reconfiguration Complete to the SeNB 300 by the MeNB 200.

A method of delivering system information of an SCG cell is described below. The method is divided into a method of delivering system information when a specific SCG cell is initially accessed and a method of changing system information when the specific SCG cell is additionally accessed, and is described below.

Figure 8:
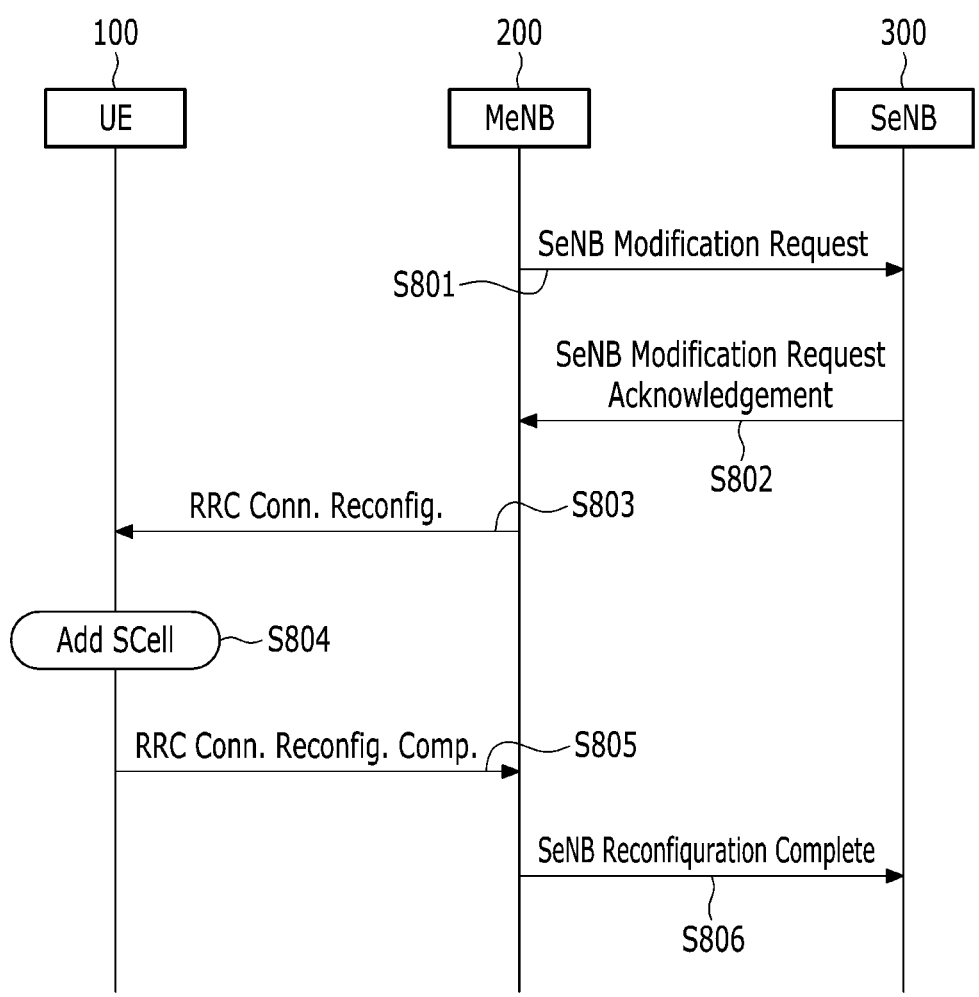
FIG. 8 is a flowchart illustrating a method of delivering system information of an SCG cell in accordance with an exemplary embodiment of the present invention.

FIG. 8 is a flowchart illustrating a method of delivering system information of an SCG cell in accordance with an exemplary embodiment of the present invention.

In accordance with an exemplary embodiment of the present invention, if an SCell included in a specific SeNB 300 is added for dual connectivity, an SCG modification procedure may be performed. In this case, a cell connected to the SeNB 300 may be a pSCell or an SCell. The UE 100 may perform an RRC signaling procedure of a UE-specific dedicated type for the UE 100 in order to receive system information of the cell. That is, the system information of the pSCell or sSCell to be added may be delivered to the UE 100 through the SeNB 300 and the MeNB 200.

First, the MeNB 200 may deliver SeNB modification request message (SeNB Modification Request) for modification of the SCG cell to the SeNB 300 at step 801. The SeNB 300 that receives SeNB Modification Request from the MeNB 200 may deliver system information to the MeNB 200 in the form of a container type information element through an acknowledgement message (SeNB Modification Request Acknowledgement) to the SeNB modification request at step S802. That is, the transmitting the system information of SCG cell in accordance with the exemplary embodiment of the present invention illustrated in the FIG. 8 may be triggered by the MeNB 200, because the MeNB 200 decides the modification of the SCG cell.

Furthermore, the MeNB 200 inserts an information element (including system information of an SCell) for adding the SCG cell into an RRC connection reconfiguration message, and delivers the RRC connection reconfiguration message to the UE 100 at step S803. The UE 100 may perform an SCG cell addition procedure based on the system information of the SCG cell included in the RRC connection reconfiguration message at step S804. Thereafter, when the SCG cell is added, the UE 100 sends an RRC connection reconfiguration complete message to the MeNB 200 at step S805. After receiving the RRC connection reconfiguration complete message, the MeNB 200 delivers an SeNB Reconfiguration Complete message to the SeNB 300 at step S806. A system information delivery method in accordance with another exemplary embodiment of the present invention, at least one step illustrated in the FIG. 5 may be used.

Figure 9:
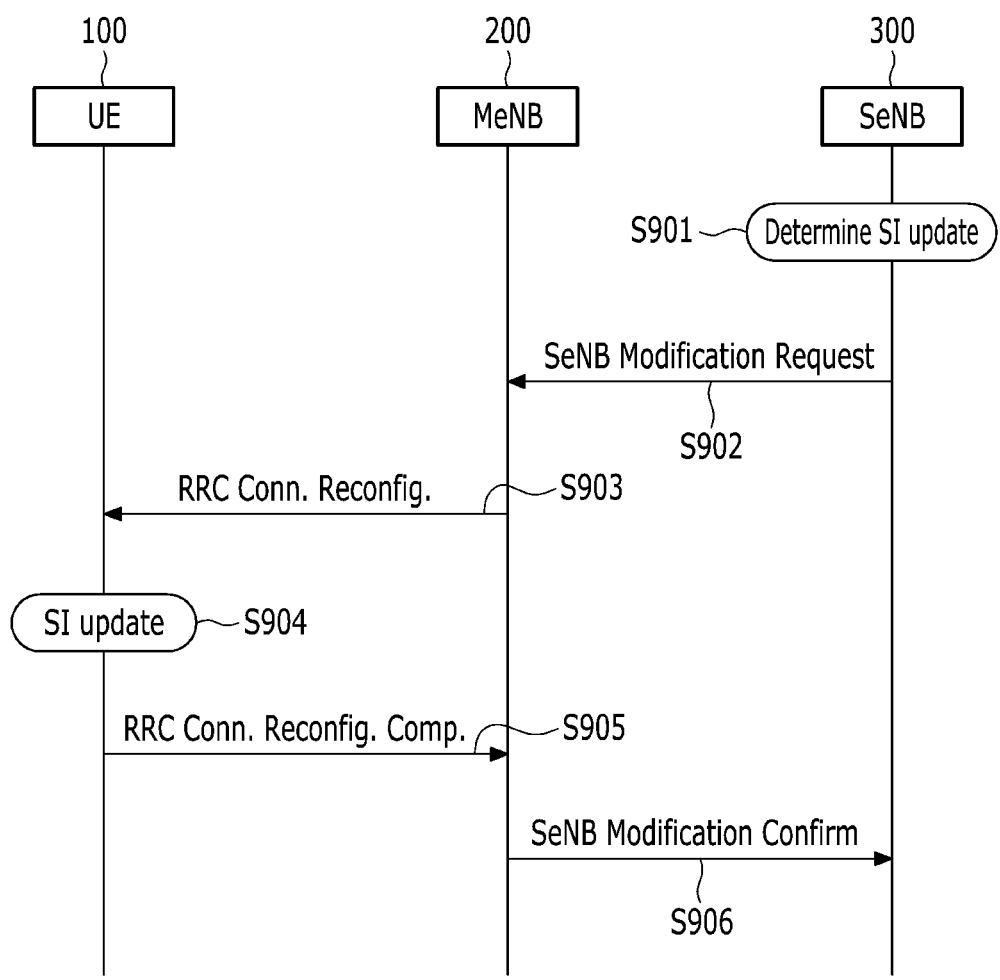
FIG. 9 is a flowchart illustrating a method of delivering system information of an SCG cell in accordance with another exemplary embodiment of the present invention.
Figure 10:
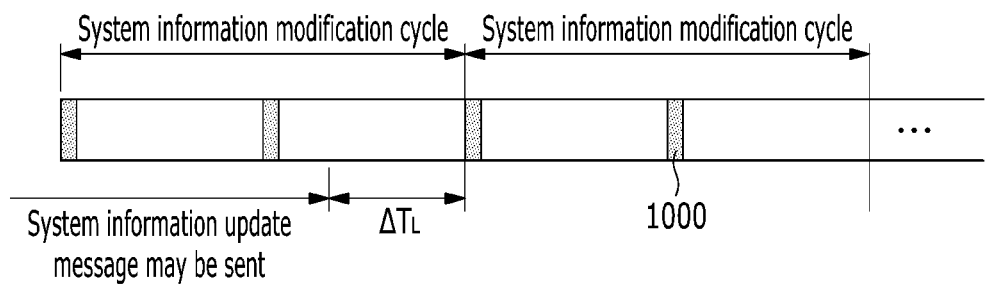
FIG. 10 is a schematic view illustrating a method of delivering changed system information by taking transmission delay into consideration in accordance with an exemplary embodiment of the present invention.

FIG. 9 is a flowchart illustrating a method of delivering system information of an SCG cell in accordance with another exemplary embodiment of the present invention, and FIG. 10 is a schematic view illustrating a method of delivering system information changed by taking transmission delay into consideration in accordance with an exemplary embodiment of the present invention.

A method of delivering changed system information of an SCG cell in accordance with an exemplary embodiment of the present invention may be applied to a case where system information used in an SCG cell is changed when the UE 100 is being connected to the SCG cell. In this case, if changed system information is delivered without taking into consideration a point of time at which system information is used between the SCG cell and the UE 100, system performance may be deteriorated. Accordingly, the point of time at which the system information is used between the SCG cell and the UE 100 needs to be synchronized.

Accordingly, the SeNB 300 delivers changed system information to the MeNB 200 by taking into consideration a point of time at which the system information of the SCG cell is changed and transmission delay on the X2 interface. Referring to FIG. 10, if transmission delay (including backhaul delay and wireless transmission delay between the MeNB/UE) is $\Delta T_L$, the SeNB 300 may start an SeNB modification procedure for changing its system information by sending a system information update message at a specific point of time prior to the transmission delay $\Delta T_L$ from a point of time at which system information 1000 is changed.

The changed system information may also be delivered through an RRC signaling procedure of a dedicated form specific to the UE 100, and the changed system information is delivered to the UE 100 through the SeNB 300 and the MeNB 200.

First, the SeNB 300 decides the update (update decision) of the system information at step S901 and delivers the changed system information and SFN/SN information about a point of time at which the changed system information is applied to the MeNB 200 through an SeNB modification request message (SeNB Modification Request) at step S902. That is, the transmitting the system information of SCG cell in accordance with another exemplary embodiment of the present invention illustrated in the FIG. 8 may be triggered by the SeNB 300.

Furthermore, the MeNB 200 delivers the changed system information and the SFN/SN information about the point of time at which the changed system information is applied to the UE 100 through an RRC Connection Reconfiguration message at step S903. In this case, the RRC Connection Reconfiguration message sent by the MeNB 200 may include an information element for the release and addition of the Scell of which system information has been changed.

After receiving the RRC connection reconfiguration message, the UE 100 recognizes the point of time at which the changed system information is applied through the received SFN/SN information element, and may perform a system information update task using information included in the release information element and addition information element of the SCell by taking into consideration the point of time at which the changed system information is applied, at step S904. Thereafter, after completing the system information update, the UE 100 sends an RRC Connection Reconfiguration Complete message to the MeNB 200 at step S905. After receiving the RRC Connection Reconfiguration Complete message, the MeNB 200 delivers an SeNB modification confirm message (SeNB Modification Confirm) to the SeNB 300 at step S906.

Figure 11:
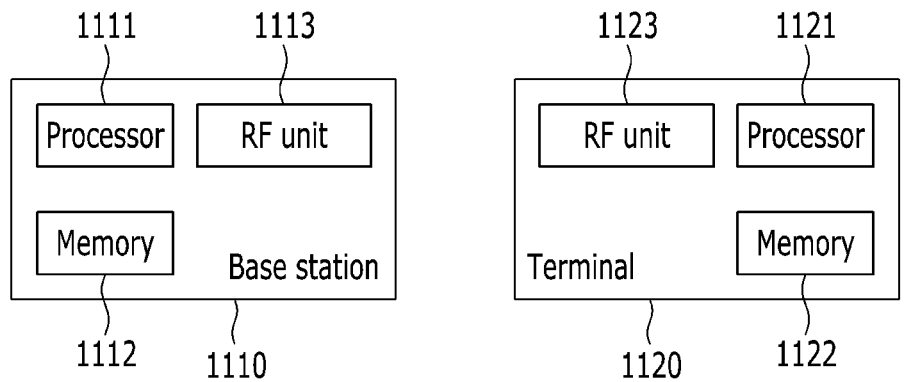
FIG. 11 is a block diagram illustrating a wireless communication system in accordance with another exemplary embodiment of the present invention.

FIG. 11 is a block diagram illustrating a wireless communication system in accordance with another exemplary embodiment of the present invention.

Referring to FIG. 11, the wireless communication system in accordance with an exemplary embodiment of the present invention may include a base station 1110, such as the MeNB 200 or the SeNB 300, and a terminal 1120, such as the UE 100.

The base station 1110 may include a processor 1111, a memory 1112, and a radio frequency (RF) unit 1113. The memory 1112 is connected to the processor 1111, and may store a variety of types of information for driving the processor 1111. The RF unit 1113 is connected to the processor 1111, and may send/receive radio signals. The processor 1111 may implement the functions, processes, or methods proposed in accordance with an exemplary embodiment of the present invention. In this case, in the wireless communication system in accordance with an exemplary embodiment of the present invention, the radio interface protocol layer may be implemented by the processor 1111. The operation of the base station 1110 in accordance with an exemplary embodiment of the present invention may be implemented by the processor 1111.

The terminal 1120 may include a processor 1121, a memory 1122, and an RF unit 1123. The memory 1122 is connected to the processor 1121, and may store a variety of types of information for driving the processor 1121. The RF unit 1123 is connected to the processor 1121, and may send/receive radio signals. The processor 1121 may implement the functions, processes, or methods proposed in accordance with an exemplary embodiment of the present invention. In this case, in the wireless communication system in accordance with an exemplary embodiment of the present invention, the radio interface protocol layer may be implemented by the processor 1121. The operation of the base station 1110 in accordance with an exemplary embodiment of the present invention may be implemented by the processor 1121.

The memory in accordance with an exemplary embodiment of the present invention may be placed inside or outside the processor. The memory may be connected to the processor through various already known means. The memory may include a variety of types of volatile or non-volatile storage media. For example, the memory may include read-only memory (ROM) or random access memory (RAM).

As described above, in accordance with an exemplary embodiment of the present invention, in a mobile communication network in which an MeNB and an SeNB are connected through non-ideal backhaul, the MeNB may efficiently deliver system information of the SeNB to a mobile terminal by sharing the frame offset of the SeNB with the mobile terminal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of sharing, by a terminal, frame offset between a master eNodeB (MeNB) and a secondary eNodeB (SeNB), the method comprising:
   receiving a measurement configuration for the SeNB via a radio resource control (RRC) signaling from the MeNB;
   receiving a master information block (MIB) from a primary secondary cell (pSCell) of the SeNB;
   measuring system frame number (SFN) of the SeNB through the MIB; and
   transmitting a measurement report including a frame offset information which is determined based on the SFN of the SeNB to the MeNB,
   wherein the MeNB and the SeNB provides dual connectivity to the terminal.

2. The method of claim 1, wherein the measurement report further includes a subframe boundary offset information which is determined based on subframe timings of the SeNB to the MeNB.

3. The method of claim 2,
   wherein the subframe boundary offset information is determined by the difference between a point of time at which the terminal receives a start subframe from the MeNB and a point of time at which the terminal receives a start subframe from the SeNB.

4. The method of claim 1,
   wherein the frame offset information is used for discontinuous reception (DRX) configuration.

5. The method of claim 1, wherein the frame offset information is used for a measurement gap configuration.

6. The method of claim 1, further comprising:
   receiving RRC Connection Reconfiguration message for adding the cell of the SeNB from the MeNB; and
   transmitting RRC Connection Reconfiguration Complete message to the MeNB.

7. The method of claim 1, wherein the measurement report further includes a radio frame boundary offset information which is determined based on subframe timings of the SeNB to the MeNB.

8. The method of claim 7, wherein the radio frame boundary offset is determined by the difference between a point of time at which the terminal receives a start radio frame from the MeNB and a point of time at which the terminal receives a start radio frame from the SeNB.

9. A method of sharing, by a master eNodeB (MeNB), frame offset between the MeNB and a secondary eNodeB (SeNB), the method comprising:
   transmitting a measurement configuration for the SeNB via a radio resource control (RRC) signaling to a terminal; and
   receiving an measurement report including a frame offset information which is determined based on a system frame number (SFN) measured by the terminal,
   wherein the SFN is measured through a master information block (MIB) received from a primary secondary cell (pSCell) by the terminal, the MeNB and the SeNB provides dual connectivity to the terminal.

10. The method of claim 9, wherein the measurement report further includes a subframe boundary offset information which is determined based on subframe timings of the SeNB and the MeNB by the terminal.

11. The method of claim 10, wherein the server; and
   subframe boundary offset information is determined by the difference between a point of time at which the terminal receives a start subframe from the MeNB and a point of time at which the terminal receives a start subframe from the SeNB.

12. The method of claim 9,
   wherein the frame offset information is used for discontinuous reception (DRX) configuration.

13. The method of claim 9, wherein the frame offset information is used for a measurement gap configuration.

14. The method of claim 9, wherein the measurement report further includes a radio frame boundary offset which is determined based on subframe timings of the SeNB to the MeNB.

15. The method of claim 14, wherein the radio frame boundary offset is determined by the difference between a point of time at which the terminal receives a start radio frame from the MeNB and a point of time at which the terminal receives a start radio frame from the SeNB.

* * * * *